US007885287B2

(12) United States Patent
Bachrach et al.

(10) Patent No.: US 7,885,287 B2
(45) Date of Patent: Feb. 8, 2011

(54) METHOD AND APPARATUS FOR ADAPTIVE NETWORK ALLOCATION

(75) Inventors: Yuval Bachrach, Haifa (IL); Boris Ginzburg, Haifa (IL)

(73) Assignee: Intel Corporation, Santa Clara, CA (US)

( * ) Notice: Subject to any disclaimer, the term of this patent is extended or adjusted under 35 U.S.C. 154(b) by 1631 days.

(21) Appl. No.: 11/093,437

(22) Filed: Mar. 29, 2005

(65) Prior Publication Data

US 2006/0221999 A1   Oct. 5, 2006

(51) Int. Cl.
*H04L 12/413* (2006.01)
(52) U.S. Cl. ........................... 370/447; 370/468
(58) Field of Classification Search ............... None
See application file for complete search history.

(56) References Cited

U.S. PATENT DOCUMENTS

| 6,216,009 | B1 * | 4/2001 | Barnett ..................... 455/510 |
| 6,674,738 | B1 * | 1/2004 | Yildiz et al. ................ 370/338 |
| 6,978,151 | B2 * | 12/2005 | Choi et al. .................. 455/522 |
| 6,983,167 | B2 * | 1/2006 | Adachi et al. ............... 455/522 |
| 7,031,336 | B2 * | 4/2006 | Scherzer et al. ............. 370/461 |
| 7,161,951 | B1 * | 1/2007 | Sherman .................... 370/447 |
| 7,421,248 | B1 * | 9/2008 | Laux et al. ................ 455/67.11 |
| 2004/0235439 | A1 * | 11/2004 | Husted et al. ............. 455/136 |
| 2005/0058151 | A1 * | 3/2005 | Yeh ......................... 370/445 |
| 2005/0210157 | A1 * | 9/2005 | Sakoda ...................... 709/251 |
| 2007/0019592 | A1 * | 1/2007 | Otsuki ....................... 370/338 |
| 2007/0047484 | A1 * | 3/2007 | Bims ......................... 370/328 |
| 2008/0144493 | A1 * | 6/2008 | Yeh ........................... 370/230 |

OTHER PUBLICATIONS

Zhu et al., "Adapting Physical Carrier Sensing to Maximize Spatial Reuse in 802.11 Mesh Networks," Wireless Communications and Mobile Computing, vol. 4, Issue 8, Dec. 2004, pp. 933-946.
Zhu et al., "Leveraging Spatial Reuse in 802.11 Mesh Networks with Enhanced Physical Carrier Sensing," IEEE International Conference on Communications, vol. 7, Jun. 2004, pp. 4004-4011.

* cited by examiner

*Primary Examiner*—Seema S Rao
*Assistant Examiner*—Rhonda Murphy
(74) *Attorney, Agent, or Firm*—Schwabe, Williamson & Wyatt, P.C.

(57) ABSTRACT

A method and apparatus for adaptive network allocation are described herein. In some embodiments, a node may receive a request-to-send (RTS) packet that includes duration information and a basic service set identifier (BSSID). The network node may update a network allocation vector based at least in part on a received signal strength of the RTS packet and the BSSID. Other embodiments may be described and claimed.

6 Claims, 5 Drawing Sheets

METHOD AND APPARATUS FOR ADAPTIVE NETWORK ALLOCATION

TECHNICAL FIELD

Embodiments of the invention relate generally to the field of networks, and more particularly to a network node providing adaptive network allocation.

BACKGROUND

A network node may use carrier sensing to determine if a shared medium is available so as to avoid packet collision. In a wireless network, the two types of carrier sensing that are typically used are physical carrier sensing, by a physical layer sampling the radio frequency (RF) energy level in the medium, and virtual carrier sensing, by a media-access control layer that updates a network node's network allocation vector (NAV). A network node maintains its NAV to indicate the period(s) during which the medium is reserved by other network nodes; hence, it knows when NOT to transmit.

A network may have several service sets with network nodes communicatively coupled to other network nodes in the same service set by an RF channel. In crowded environments, more than one service set may be operating on the same channel in the same vicinity. If this is the case, a network node from one service set may pick up NAV information from a network node in a neighboring service set and be prevented from transmitting for a certain period. This may be the case even if communications from the two network nodes could take place simultaneously without interfering with one another.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Illustrative embodiments of the present invention include a network node designed to selectively update network allocation information based at least in part upon strength of a received signal.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific materials and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the present invention; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise.

Figure 1:
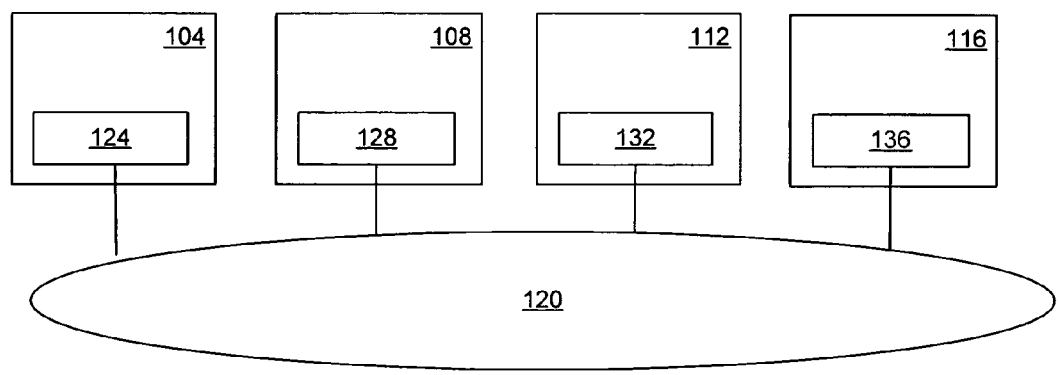
FIG. 1 illustrates a network comprising multiple network nodes in accordance with an embodiment of the present invention.

FIG. 1 illustrates a network 100 having network nodes 104, 108, 112, and 116 coupled to a shared medium 120 in accordance with an embodiment of the present invention. Each of the network nodes 104, 108, 112, and 116 may have respective network interface controllers 124, 128, 132, and 136 to facilitate communication with other network nodes over the medium 120.

One or more of the network nodes 104, 108, 112, and 116 may employ a contention protocol that facilitates access to the medium 120 in a manner to reduce the occurrence of data collision. Data collision may occur when two or more network nodes transmit data on the same frequency resulting in a failed reception of the data. Various embodiments of the present invention may involve contention protocols accounting for the strength of a signal from at least one of the participating network nodes of a communicative exchange when determining whether or not parallel data transmissions over the medium 120 may be done within tolerable data-collision risk parameters.

Figure 2:
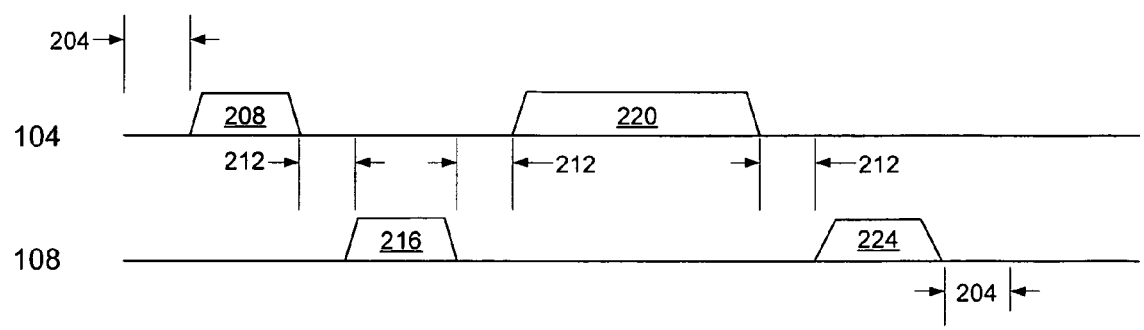
FIG. 2 illustrates waveform graphs for a communicative exchange between nodes of a network, in accordance with an embodiment of the present invention.

In one embodiment, the network node 104 may intend to transmit data to network node 108. FIG. 2 illustrates waveform graphs depicting a communicative exchange between network nodes 104 and 108 in accordance with an embodiment of the present invention. In this embodiment, if the medium 120 is silent for a predetermined time, e.g., distributed interframe spacing (DIFS) 204, the network interface controller 124 may transmit a control frame such as a request-to-send (RTS) frame 208 asserting its request to transmit data to network node 108. Upon receipt of the RTS frame 208, and after another predetermined time period, e.g., short interframe spacing (SIFS) 212, the network interface controller 128 of network node 108 may reply by transmitting a control frame such as a clear-to-send (CTS) frame 216. The network interface controller 124 may receive the CTS frame 216 and, after another SIFS 212, may transmit data in a DATA frame 220. After successful receipt of the DATA frame 220 and another SIFS 212, the network interface controller 128 may transmit an acknowledgment (ACK) frame 224.

In various embodiments of this invention control frames, e.g., RTS 208 and CTS 216, may include a variety of information including the receiving address (RA), which may indicate the media-access content (MAC) address of the network node to which the frame is sent, and network allocation information (NAI) including the amount of time the remainder of the anticipated communicative exchange, e.g., between network nodes 104 and 108, may occupy a medium, e.g., medium 120. The NAI information conveyed by the control frames may communicate the preoccupation of the medium 120 to network nodes not directly involved with the communicative exchange, e.g., network nodes 112 and 116. The network nodes 112 and 116 may then have an opportunity to update their respective NAIs, e.g., their network allocation vectors (NAVs), with the NAI of the control frames.

In one embodiment whether or not the network nodes 112 and/or 116 update their NAIs based on the NAI of the control frames may be based, at least in part, on the signal strength of the control frames. In one embodiment, if network node pairs 104/108 and 112/116 are separated a sufficient distance, it may be possible for communicative exchanges to take place amongst network nodes 112 and 116 without interfering with communications between the network nodes 104 and 108.

In one embodiment, the network interface controller 132 may ascertain whether a signal transmission to network node 116 would be likely to interfere with the signal transmissions between network nodes 104 and 108 by referencing the signal strength of the control frames sent from/to network nodes 104 and/or 108.

In one embodiment, the network interface controller 132 may determine a received signal strength indication (RSSI) for one or both of the control frames. If the RSSI is below a predetermined threshold value the network interface controller 132 may determine that the probabilities of data collision due to parallel transmissions are within tolerable risk parameters and it may transmit an RTS frame to network node 116. The network interface controller 136 of network node 116 may receive the RTS frame and, through a similar manner, determine if network nodes 104 and 108 are in a range that would present a high probability of interference based on the signal strength of one or both of the control frames sent by network nodes 104 and/or 108. If the network interference controller 136 determines that the probabilities of data collision due to parallel transmissions are within tolerable risk parameters it may respond by transmitting a CTS frame to network node 112. In this manner, network node pairs 104/108 and 112/116 may simultaneously communicate with one another in a parallel manner over the shared medium 120.

In various embodiments the network interface controllers may include a table having cross-references of RSSIs in relation to other nodes of the network 100. For example, network interface controller 136 may determine an RSSI for each of the network nodes 104, 108, and 112 relative to network node 116. This information may then be communicated to network nodes 104, 108, and 112. If network node 112 wishes to instigate a communicative exchange with network node 116 while network nodes 104 and 108 are communicating, it may reference not only its own RSSI of the network nodes 104 and 108, but also network node 116's RSSI of the network nodes 104 and 108. If the RSSI of the network nodes 104 and 108 relative to both network nodes 112 and 116 are less than the predetermined threshold value, the network interface controller 132 may instigate a communicative exchange by transmitting an RTS frame.

In various embodiments, the network 100 may have a wide variety of topologies, protocols, and/or architectures. For example, in one embodiment, the network 100 may be a wireless distributed network having a carrier-sensing multiple access/collision avoidance (CSMA/CA) architecture. In an embodiment the network 100 may comply with one or more standards for wireless communications, including, for example, one or more of the IEEE 802.11(a), 802.11(b) and/or 802.11(g) (ANSI/IEEE 802.11 standard, IEEE std. 802.11-1999, reaffirmed Jun. 12, 2003) standards for wireless local area networks (WLANs), along with any updates, revisions, and/or amendments to such. In various embodiments, the network 100 may additionally or alternatively comply with other communication standards.

In various embodiments, the medium 120 may be a wire media such as, but not limited to, coaxial, twisted pair, or optical fiber. In other embodiments, the medium 120 may be a wireless medium, e.g., radio frequency (RF) or infrared (IR). In an embodiment where the medium 120 is a wireless medium, the network interface controllers 124, 128, 132, and 136 may have transmitters and/or receivers that are designed to operate on a channel frequency in a range between, e.g., 2400 Megahertz (MHz) and 2495 MHz or 5170 MHz and 5810 MHz.

In various embodiments, the network nodes 104, 108, 112, and 116 may represent a wide variety of devices capable of networking with other devices. In various embodiments, the network nodes 104, 108, 112, and/or 116 may be stations and/or access points such as, but not limited to, a personal communication device, a wireless internet protocol (IP) phone, a tablet computing device, a desktop computing device, a network access device, a router, a hub, and a switch.

Figure 3:
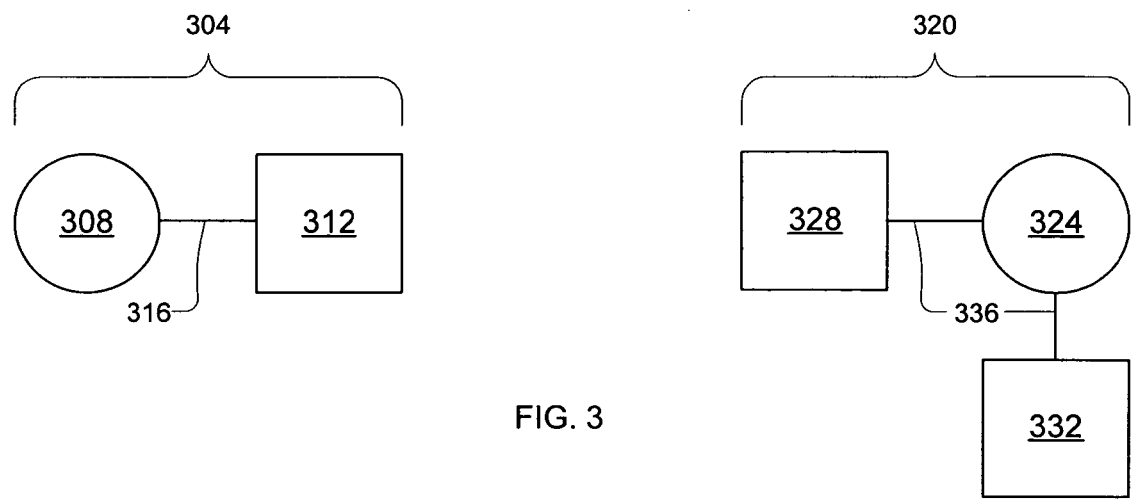
FIG. 3 illustrates network nodes belonging to different service sets in accordance with an embodiment of the present invention.

FIG. 3 illustrates an embodiment of a network 300 divided into service sets. In this embodiment, a first service set 304 may include network nodes, e.g., access point 308 and station 312, communicatively associated with one another through a medium 316. A second service set 320 may include an access point 324 communicatively associated with stations 328 and 332 through a medium 336. In one embodiment, the mediums 316 and 336 may be the same channel frequency and therefore may provide a potential source of inter-service set interference between service sets 304 and 320. The access points 308 and 324 and stations 312, 328, and 332 of this embodiment may be similar to any of the network nodes described and discussed in above embodiments.

In one embodiment, a network node may consider the service set of the origin and/or destination of the control frames, in addition to the signal power, when determining whether or not to update their NAI. For example, if station 328 were to sense control frames negotiating an upcoming communicative exchange between access point 324 and station 328 it may determine that there is an increased risk of data collision and refrain from instigating a simultaneous communication. Therefore, in this embodiment, the station 332 may update its NAI based on NAI included in control frames being sent between access point 324 and station 328.

As shown, the network 300, which may be similar to network 100, may be an infrastructure-based basic service set (BSS). In other embodiments, networks 100 and/or 300 may include other associative service sets such as, but not limited to, independent service sets (IBSSs) and extended service sets (ESSs).

Figure 4:
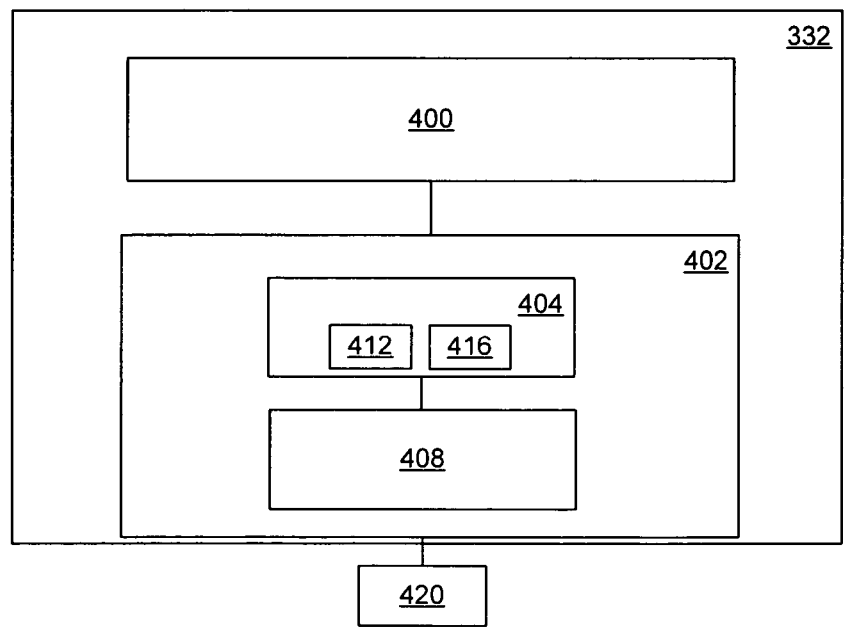
FIG. 4 illustrates a network node in accordance with an embodiment of the present invention.

FIG. 4 illustrates the station 332 depicted in FIG. 3 in greater detail in accordance with an embodiment of the present invention. In this embodiment the station 332 may include a processor 400 coupled to a network interface controller 402. The network interface controller 402 may have a media-access control block 404 coupled to a physical-signaling block 408 as shown. The media-access control block 404 may include a transmitter 412, a receiver 416, and circuitry to implement a contention protocol to facilitate access to the medium 336. The physical signaling block 408 may be a mechanism for providing physical signaling on the medium 336. In one embodiment, the media-access control block 404 may use the physical-signaling block 408 for various functions involved in carrier-sensing, transmission of frames, and/or reception of frames. Although this embodiment describes elements of the station 332, other embodiments may include other network nodes, e.g., access points, having elements similar to those described above.

In one embodiment, the medium 336 may be a wireless medium and the network interface controller 402 may be coupled to an antenna 420 to facilitate communication with the medium 336. In various embodiments, the antenna 420 may be integrated or external to the station 332 and may be a monopole or a dipole antenna.

Figure 5:
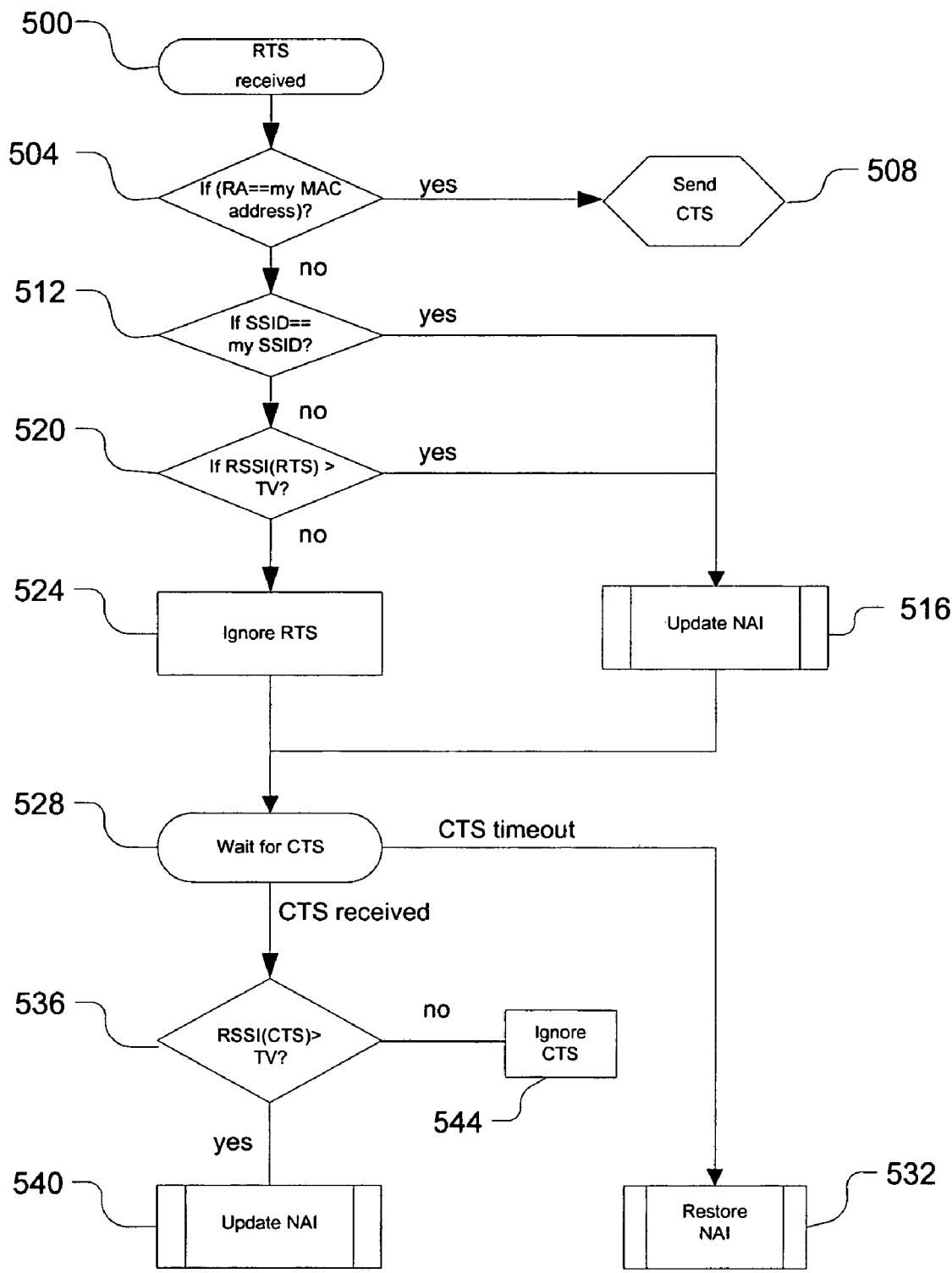
FIG. 5 illustrates a methodology of selectively updating network allocation information when a request-to-send control frame is received in accordance with an embodiment of the present invention.

The media-access control block 404 may include logic designed to selectively update NAI information based on various conditions. FIG. 5 illustrates a methodology of selectively updating NAI when an RTS frame is received, in accordance with an embodiment of the present invention. The media-access control block 404 may receive a control frame such as an RTS frame 500, which may include, in addition to RA and NAI, a service set identifier (SSID) of the service set having the participating network node.

The media-access control block 404 may determine if the RTS is being sent to station 332 by comparing the MAC address of the media-access control block 404 to the RA in the RTS frame 504. If the RTS is being sent to the station 332, then the media-access control block 404 may respond by causing a CTS frame to be transmitted in reply 508. If the RTS frame is not directed to the station 332, the media-access control block 404 may determine if the RTS is being sent to a network node that is in the service set 320 by referencing the SSID of the RTS 512. If the intended recipient network node of the RTS is in the service set 320 the media-access control block 404 may cause its NAI to be updated with NAI information included in the RTS 516. If the intended recipient network node is not in the service set 320 the media-access control block 404 may determine whether an RSSI of the RTS (RSSI(RTS)) is greater than a threshold value 520. In one embodiment, the threshold value may be a constant value, e.g., −82 dBm, where dBm is a unit expressing absolute power levels in terms of decibels (dB) and reference level "m," for example 1 megawatt (mW). In another embodiment the threshold value may be a dynamically adapted variable, e.g., to accommodate changing relationships of the network 300. If the RSSI(RTS) is less than the threshold value the media-access control block 404 may ignore the NAI information contained in the RTS 524.

After the determination of whether NAI information found in the RTS will be used, the media-access control block 404 may wait for a CTS frame that may be transmitted in reply to the RTS frame 528. If the CTS frame is not received within a CTS timeout period (e.g., 2×SIFS+CTS_time+2×slot time) the NAI may be restored 532. Note that if the RTS was ignored 524 then restoring the NAI simply means leaving it as is. However, if the NAI was updated 516, then NAI will be restored to pre-update value.

If a CTS is received within the CTS timeout period, the media-access control block 404 may compare the RSSI(CTS) to a threshold value 536, which may or may not be the same value as used in phase 520. If the RSSI(CTS) is greater than the threshold value, the media-access control block 404 may use the NAI information in the CTS frame to update its NAI 540. If the RSSI(CTS) is less than then threshold value, then the CTS may be ignored 544.

In such a manner, and in accordance with an embodiment of the present invention, the station 332 may rely on, at least in part, the signal strength of control frames of the service set in which the communicative exchange is taking place, to determine whether or not to update its NAI information with NAI information included in the control frames.

Figure 6:
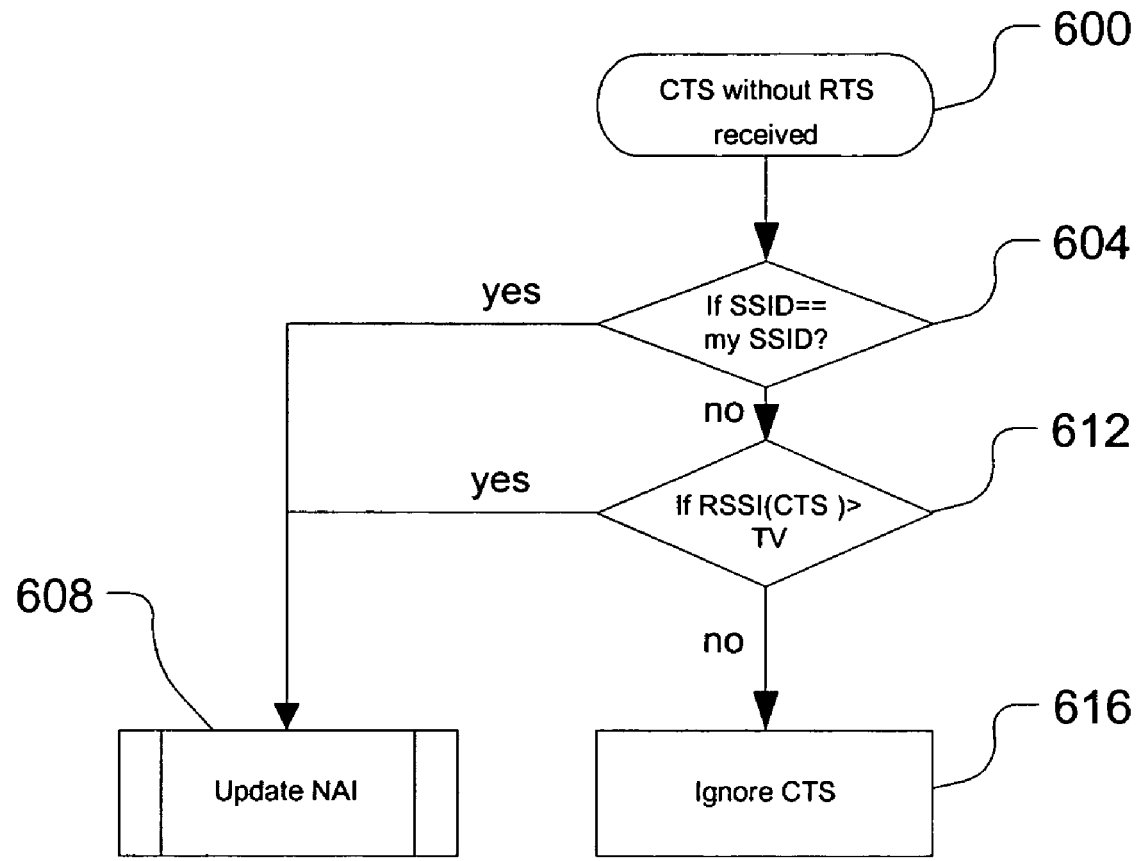
FIG. 6 illustrates a methodology of selectively updating network allocation information when a clear-to-send control frame is received, in accordance with an embodiment of the present invention.

FIG. 6 illustrates a methodology of selectively updating NAI when a CTS frame is received without a preceding RTS frame, in accordance with an embodiment of the present invention. In this embodiment, the media-access control block 404 may receive a CTS frame 600. The SSID of the CTS frame may be evaluated 604 to determine if it is the service set 320. If it is determined that the CTS frame is being sent to a network node within service set 320 then the NAI in the CTS frame may be used to update media-access control block 404 NAI. If the CTS frame is being sent to network node that is not within service set 320 then the RSSI(CTS) may be compared to a threshold value 612. If the RSSI(CTS) is greater than the threshold value, NAI information in the CTS may be used to update media-access control block 404 NAI 608; otherwise, the NAI of the CTS may be ignored 616.

The RTS and CTS control frames discussed with reference to above embodiments are only two mechanisms to convey NAI to nodes of a network. In other embodiments, other mechanisms may be employed to convey this information. For example, in one embodiment a polling mechanism may be used. This embodiment may be used with, e.g., a basic service set. In one embodiment, an access point may send a contention-free poll (CF poll) to initiate a communicative exchange with a station in its service set. The CF poll may include NAI to provide a transmission opportunity (TXOP) for a particular station by reserving the medium for use by that station. The station for which the medium is reserved may be referred to as the TXOP holder. The access point may also open a reserved medium through the NAI of the CF poll. In one embodiment, a CF poll, similar to other control frames, may also include an SSID and an RA.

In one embodiment, and similar to an embodiment discussed above, the station 332 may have a table in which it may store information about other network nodes. This table may be stored in a storage medium that is accessible to, or a part of, the media-access control block 404. The table may include information on other network nodes, e.g., 308, 312, 328, and/or 324. In various embodiments, the information stored in the table could be, but is not limited to, a MAC address, an RSSI, and/or an SSID. In one embodiment the table may only include information on network nodes outside of service set 320; however, other embodiments may include information on inter-service set network nodes as well. In one embodiment the RSSI values may be determined by the RSSI from the last frame, an average RSSI over last N frames, or some other determination process.

Figure 7:
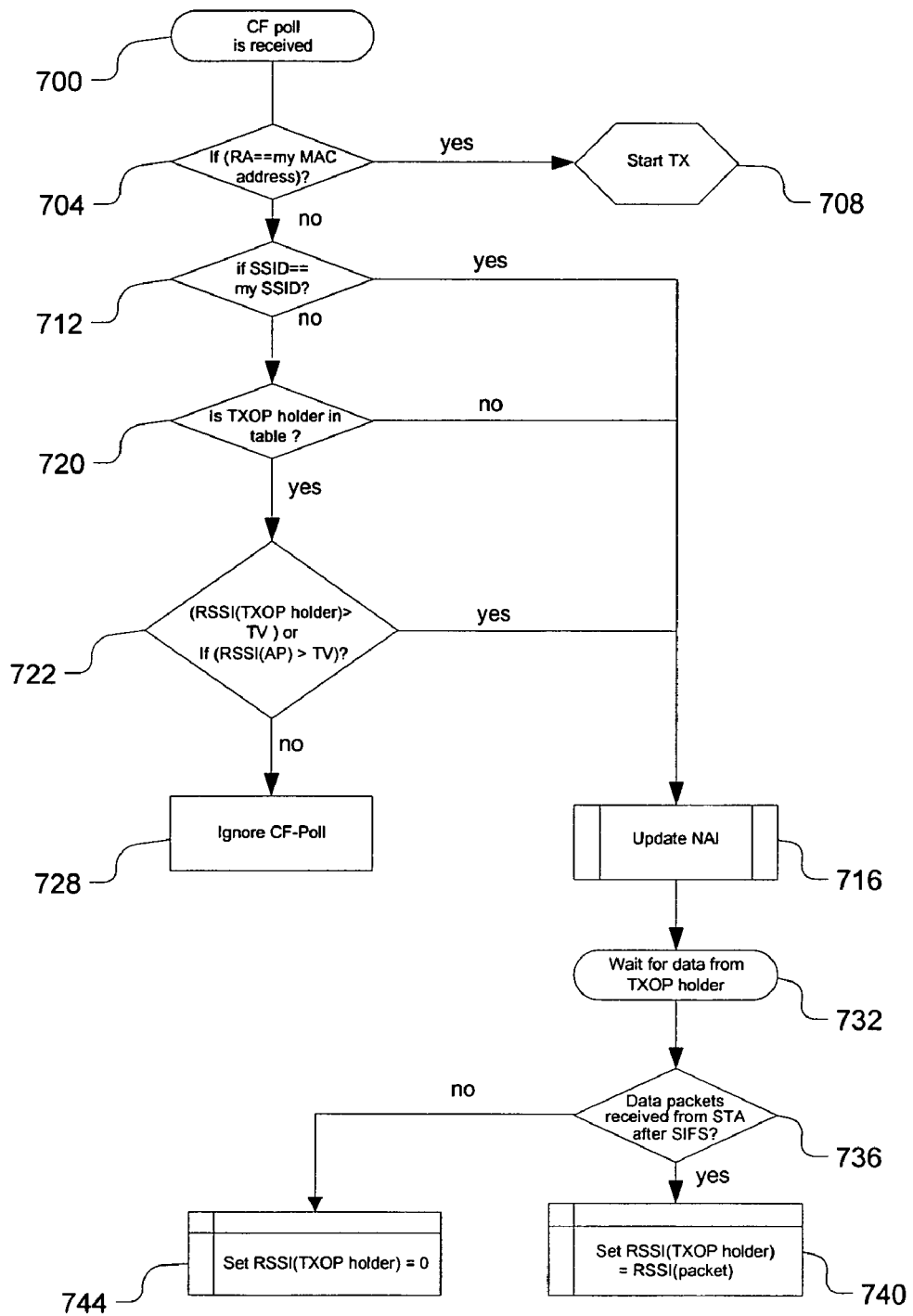
FIG. 7 illustrates a methodology of selectively updating network allocation information when a contention-free poll control frame is received, in accordance with an embodiment of the present invention.

FIG. 7 illustrates a methodology of selectively updating NAI when a CF-poll is received, in accordance with an embodiment of the present invention. In this embodiment, the media-access control block 404 may receive a CF-poll from an access point 700. If the CF poll is addressed to the station 332, which may be determined by reference to RA 704, then the media-access control block 404 may cooperate with the physical-signaling block 408 to transmit data in a DATA frame 708. If the CF poll is not addressed to station 332, it may be determined whether the TXOP holder is in the service set 320 by reference to the SSID 712. In one embodiment, if the TXOP holder is in the service set 320 the station 332 may update its NAI based on the NAI of the CF poll 716. If the TXOP holder is not in the service set 320 the media-access control block 404 may determine if the TXOP holder is in the table by comparing the RA to the MAC addresses stored in the table 720. If the TXOP holder is not in the table the station 332 may update its NAI based on the NAI of the CF poll 716.

If the TXOP holder is in the table the media-access control block 404 may reference the signal strengths of the TXOP holder and of the access point. If either the RSSI(TXOP holder) or the RSSI(AP) is greater than the threshold value the station 332 may update its NAI based on the NAI of the CF poll 716. However if both are less than the threshold value 722, the CF poll and any NAI it may contain may be ignored 728.

In one embodiment, after the station 332 updates its NAI based on the NAI of the CF poll 716, it may wait for data from the TXOP holder 732. In one embodiment, if the station 332 receives a data packet shortly after SIFS 736 it may update or assign the RSSI(TXOP holder) with the RSSI of the network node transmitting the data packets 740. The media-access group 404 may store this value in the table. If no data packets are received shortly after SIFS then the media-access group 404 may set RSSI(TXOP holder) equal to 0 in the table 744.

Accordingly, methods and apparatuses for providing adaptive network allocation based at least in part upon a received signal strength of a signal from at least one of the participating network nodes of a communicative exchange have been described. Although the present invention has been described in terms of the above illustrated embodiments, it will be appreciated by those of ordinary skill in the art that a wide variety of alternate and/or equivalent implementations calculated to achieve the same purposes may be substituted for the specific embodiments shown and described without departing from the scope of the present invention. Those with skill in the art will readily appreciate that the present invention may be implemented in a very wide variety of embodiments. This description is intended to be regarded as illustrative instead of restrictive on embodiments of the present invention.

What is claimed is:

1. A method comprising:
   receiving by a first network node a request-to-send (RTS) frame over a medium, the RTS frame being received with a first signal strength and including first duration information and a first basic service set identifier (BSSID);
   determining, by the first network node, the first BSSID is different than a second BSSID with which the first network node is associated;
   determining, by the first network node, the first signal strength is greater than a threshold value based at least in part on said determining that the first BSSID is different than the second BSSID;
   updating, by the first network node, a network allocation vector from a first state to a second state based at least in part upon said first duration information and determining that the first signal strength is greater than the threshold value;
   restoring the network allocation vector to the first state based at least in part on a determination that a clear-to-send (CTS) frame was not received within a predetermined time period from receipt of the RTS frame;
   receiving by the first network node another RTS frame over the medium, the another RTS frame having second duration information and a second signal strength;
   comparing the second signal strength to the threshold value;
   updating the network allocation vector with the second duration information based at least in part on a determination that the second signal strength is greater than the threshold value;
   determining another CTS frame, responsive to the another RTS frame, is received with a signal strength less than the threshold value; and
   ignoring third duration information included in the another CTS frame based at least in part on said determining the received signal strength of the another CTS frame is less than the threshold value.

2. The method of claim 1, wherein the network allocation vector includes information relating to an availability state of the medium for a transmission from the first network node.

3. The method of claim 1, further comprising:
   receiving, by the first network node, a third RTS frame, the third RTS frame being received with a third signal strength and including third duration information and a third BSSID;
   determining the third BSSID is the same as the second BSSID; and
   updating the network allocation vector with the third duration information based at least in part on said determining the third BSSID is the same as the second BSSID and independent of the second signal strength.

4. An apparatus comprising:
   a receiver to receive first and a second request-to-send (RTS) frames and a second clear-to-send (CTS) frame over a medium, the first RTS frame being received with a first signal strength and including first duration information and a first basic service set identifier (BSSID), the second RTS frame having second duration information and a second signal strength; and
   a controller, coupled to the receiver,
      to determine the first BSSID is different than a second BSSID that identifies a basic service set with which the apparatus is associated;
      to determine the first signal strength is greater than a threshold value based at least in part on said determination that the first BSSID is different than the second BSSID;
      to update a network allocation vector from a first state to a second state based at least in part upon said first duration information and said determination that the first signal strength is greater than the threshold value;
      to restore the network allocation vector to the first state based at least in part on a determination that a first CTS frame was not received within a predetermined time period from receipt of the first RTS frame;
      to compare the second signal strength to the threshold value;
      to update the network allocation vector with the second duration information based at least in part on a determination that the second signal strength is greater than the threshold value;
      to determine the second CTS frame, responsive to the second RTS frame, is received with a signal strength less than the threshold value; and
      to ignore third duration information included in the second CTS frame based at least in part on said determining the received signal strength of the second CTS frame is less than the threshold value.

5. The apparatus of claim 4, wherein the apparatus further comprises a transmitter, coupled to the controller, to transmit a signal over the medium, and the controller is to control the transmitter to transmit the signal based at least in part upon the network allocation vector.

6. The apparatus of claim 5, further comprising a transceiver having said transmitter and receiver.

* * * * *